Oct. 12, 1965 D. G. FISCHER ETAL 3,212,073
MAGNETIC STORAGE
Original Filed Sept. 1, 1959 3 Sheets-Sheet 1
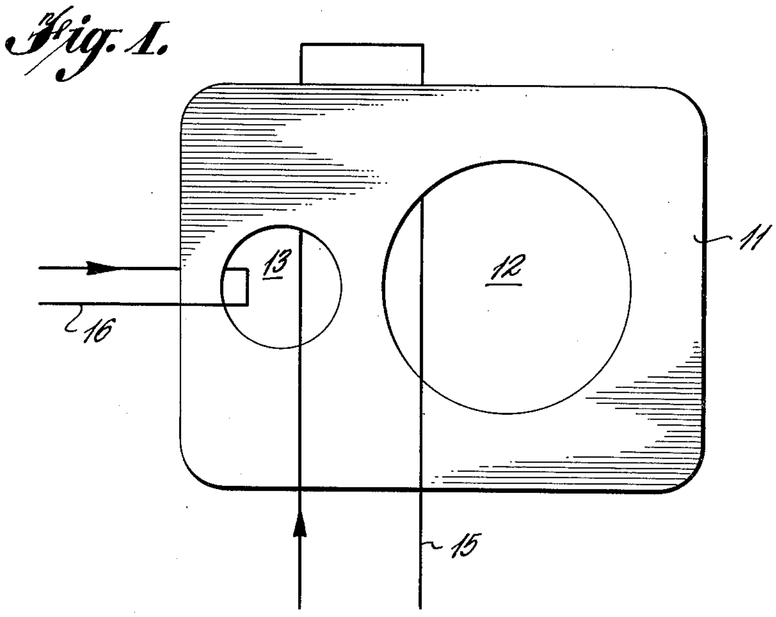
Fig. 2.
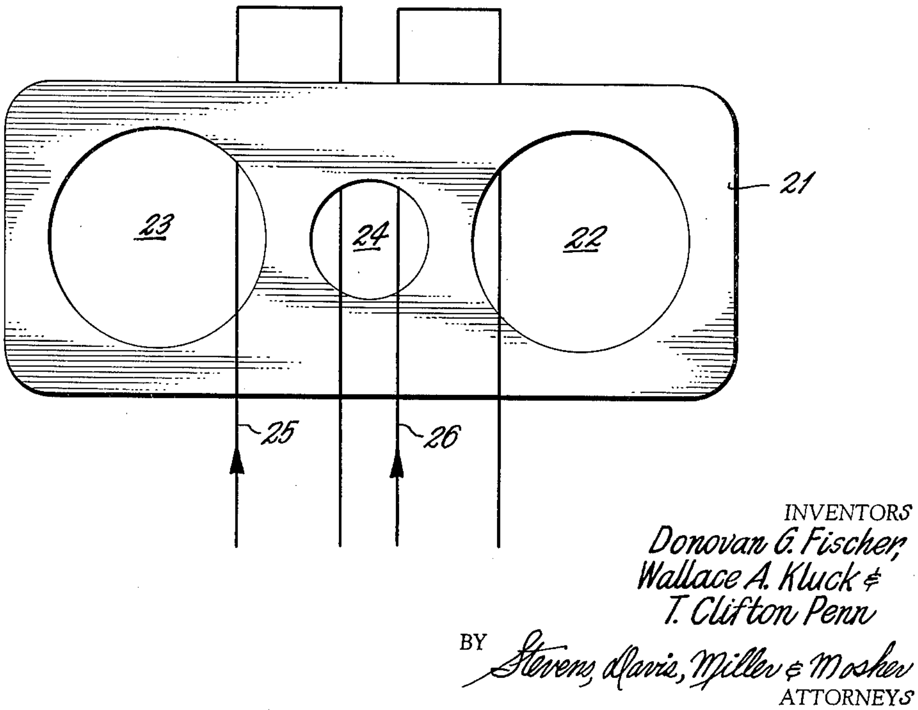
INVENTORS
Donovan G. Fischer,
Wallace A. Kluck &
T. Clifton Penn
BY Stevens, Davis, Miller & Mosher
ATTORNEYS INVENTORS
Donovan G. Fischer,
Wallace A. Kluck &
T. Clifton Penn
BY Stevens, Davis, Miller & Mosher
ATTORNEYS INVENTORS
Donovan G. Fischer,
Wallace A. Kluck &
T. Clifton Penn
BY Stevens, Davis, Miller & Mosher
ATTORNEYS 3,212,073
Patented Oct. 12, 1965

3,212,073

MAGNETIC STORAGE

Donovan G. Fischer and Wallace A. Kluck, Dallas, and Thomas C. Penn, Richardson, Tex., assignors to Texas Instruments Incorporated, Dallas, Tex., a corporation of Delaware Continuation of abandoned application Ser. No. 837,525, Sept. 1, 1959. This application Aug. 10, 1962, Ser. No. 217,254
11 Claims. (Cl. 340—174)

Figure 1A:
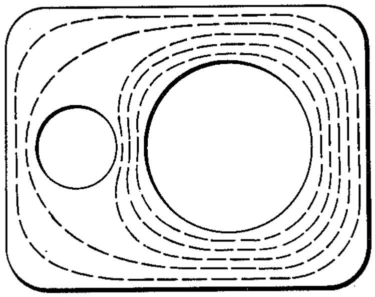

This invention relates to a novel method of using a magnetic storage element and to a digital storage system employing this method.

This is a continuation of the parent application Serial No. 837,525, filed September 1, 1959, now abandoned.

In digital computers and data processing equipment, information is normally coded in a binary system in which all information is represented by different combinations of two symbols, which are usually the symbol "one" (1) and the symbol "zero" (0). To store these symbols, circuit elements or components are required which have two stable states, one state to store each of the two symbols. The magnetic core of the type having a rectangular hysteresis loop lends itself ideally for this purpose because it can store binary information indefinitely without continuous expenditure of power. However, the magnetic core has the disadvantage that it is necessary to erase the stored information in order to read the information out of the magnetic core. Therefore, if the memory of the information is to be retained, some means must be provided to restore the information after it is read out. To avoid this problem, a magnetic storage element called a transfluxer was developed. The transfluxer is disclosed in an article by Rajchman and Lo in the Proceedings of the IRE, vol. 44, pages 321–332, March, 1956. The stored digit can be read out of the transfluxer without erasing it. The transfluxer, however, has one very serious disadvantage in that two sets of windings are required, one set for reading out and the other set for storing. In addition to this disadvantage, two different sizes of current pulses are required to store the two different binary digits. The magnitude of these current pulses must be very closely controlled to avoid malfunctioning, particularly when the transfluxers are employed in a matrix such as that shown in FIGURE 13 of the Rajchman and Lo article. The seriousness of these disadvantages is probably the reason why this particular memory has never been used for computer applications, at least to the knowledge of the inventors.

The memory element used in the present invention is structurally very similar to one disclosed by Lloyd B. Hunter in Patent No. 2,869,112. However, the mode of operation of the Hunter memory element is very different from that of the present invention in that the method utilized by Hunter causes the stored information to be erased when the information is read out. The present invention utilizes a similar memory element in providing a magnetic storage which may be read without erasing the information, yet the element has none of the disadvantages of the transfluxer pointed out above.

It is therefore one object of this invention to provide a magnetic storage system which may be read without erasing the information stored therein.

Another object of the present invention is to provide a magnetic storage system which uses the same driving coils for both reading and writing information.

Another object of this invention is to provide a magnetic storage system which is capable of operation at high speeds.

Yet another object of this invention is to provide a magnetic storage system in which the magnitude of the switching signals is less critical than in some systems of the prior art.

Figure 1B:
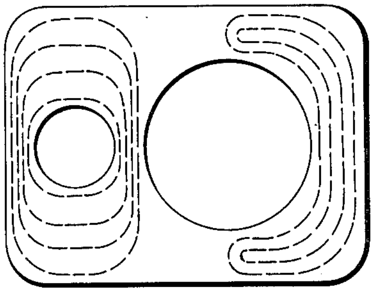
Figure 2A:
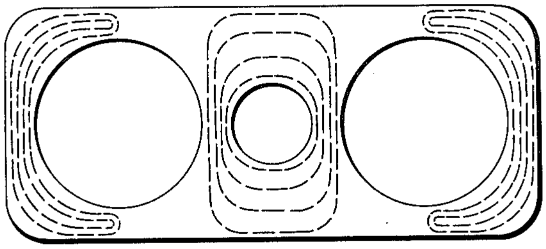
Figure 2B:
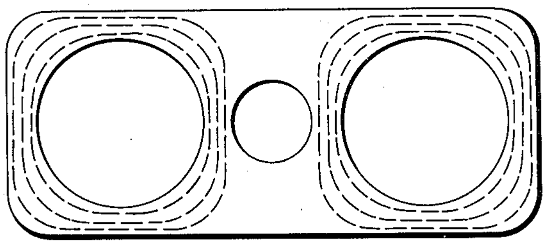
Figure 3:
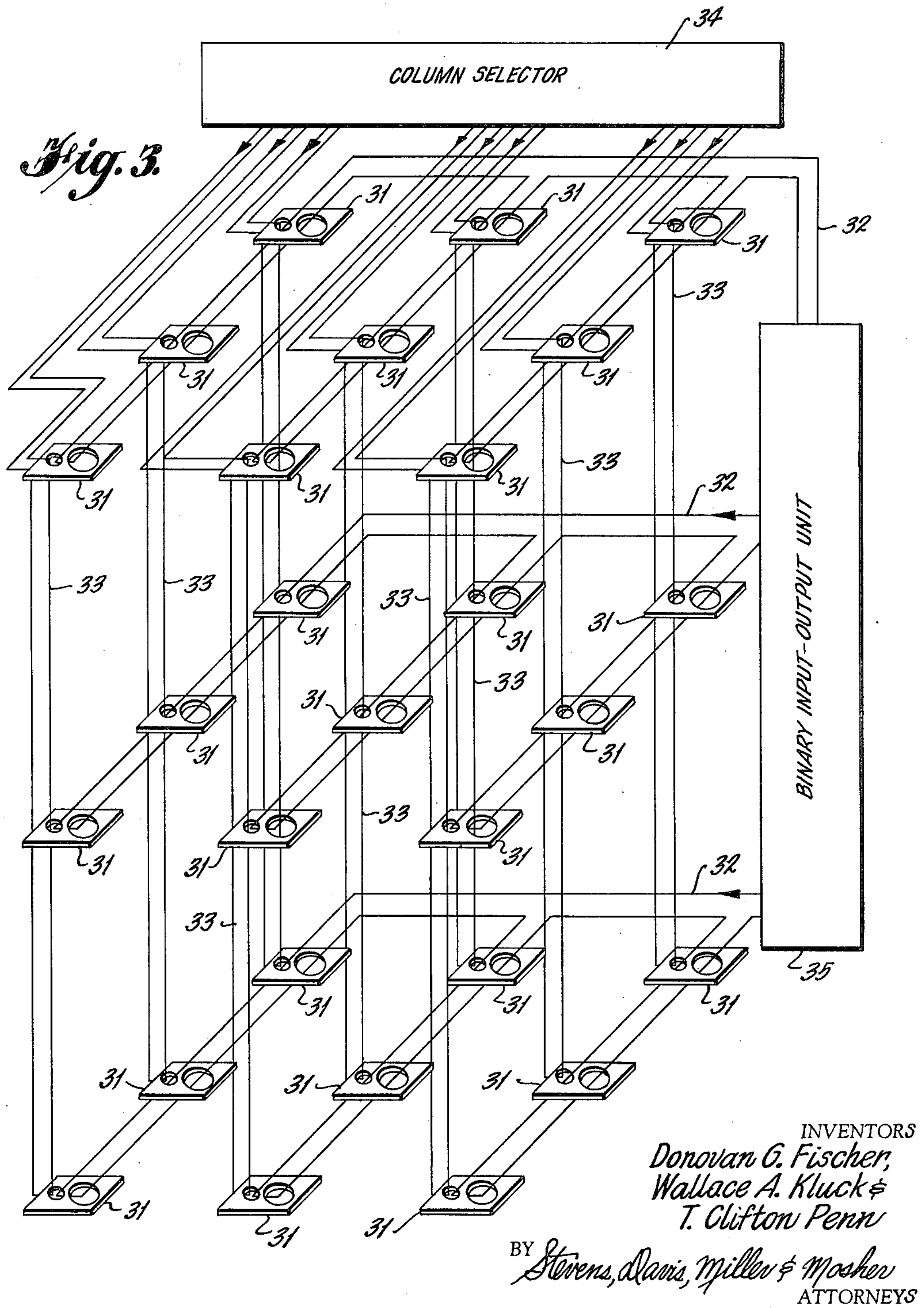

Further objects and advantages of the present invention will become readily apparent as the following detailed description of the preferred embodiment of the invention unfolds and when taken in conjunction with the drawings wherein:

FIGURE 1 shows one form of the memory element used in the invention;

FIGURE 1*a* shows the pattern of the flux lines established within the memory element of FIGURE 1 under blocked conditions;

FIGURE 1*b* shows the pattern of the flux lines established within the memory element of FIGURE 1 under unblocked conditions;

FIGURE 2 shows another form of the memory element used in the invention;

FIGURE 2*a* shows the pattern of the flux lines established within the memory element of FIGURE 2 under unblocked conditions;

FIGURE 2*b* shows the pattern of the flux lines established within the memory element of FIGURE 2 under other conditions; and FIGURE 3 shows the memory element connected in a memory system.

The memory elements shown in FIGURES 1 and 2 both comprise bodies of magnetic material which have a rectangular hysteresis characteristic. Windings are provided on these bodies of magnetic material. To facilitate the description, these windings are shown with an arrow indicating direction of conventional current flow. Current flowing in the direction of the arrow in a winding is defined as positive current and, accordingly, current flowing in the opposite direction is defined as negative current. The function of each of the storage elements of FIGURES 1 and 2 is to store a binary digit and provide for the reading out of the binary digit stored without erasing it.

The storage element shown in FIGURE 1 comprises a body of magnetic material 11 in which a large hole 12 and a small hole 13 are defined. The holes 12 and 13 are positioned adjacent to one another. This construction provides a relatively long magnetic path around the large hole 12 and a relatively short magnetic path around the small hole 13. The long magnetic path has a common part with the short magnetic path. The longest magnetic path around the small hole is of the same order of magnitude or less than the circumference of the large hole. It must also be noted that the relative cross-sectional areas of the magnetic paths are important in that the cross-sectional area of the path around the small hole should be approximately one-half the cross-sectional area of the magnetic path around the large hole. Deviation from this ratio will decrease the signal-to-noise ratio of the element, thus introducing noise into the system. A first winding 15 is wound through both holes 12 and 13 and a second winding 16 is wound only through the hole 13.

The operation of the storage element is based on a phenomenon referred to as blocking and unblocking of the storage element. The storage element is blocked when the material in the long magnetic path around the large hole is saturated in one direction or the other with the flux lines passing around the large hole and on both sides of the small hole. The flux line pattern of the storage element of FIGURE 1, when it is blocked, is shown in FIGURE 1A with the dashed lines representing the lines of flux. The storage element is unblocked when the material in the short magnetic path around the small hole is magnetically saturated in one direction or the other. The flux line pattern of the storage element of FIGURE 1 when it is unblocked is shown in FIGURE 1*b* with the dashed lines representing the flux lines. When the storage element is unblocked, the flux around the small hole may be in either direction. The flux lines around the large hole will be as shown. It will be observed that these flux lines do not completely encircle the large hole; instead, these flux lines double back on themselves in such a manner as to form a C-shaped pattern around one side of the large hole.

To store one of the two binary digits, the storage element is blocked; and to store the other of the two binary digits, the storage element is unblocked. To facilitate description of the operation of the storage element, the stored binary digit, when the storage element is blocked, shall be defined as ZERO and the stored binary digit, when the storage element is unblocked, shall be defined as ONE.

To store either a ONE or a ZERO, first a large negative pulse is applied to the winding 16. This pulse must have sufficient magnitude to establish lines of flux around the small hole in a clockwise direction, regardless of previous conditions which may have existed in the element. The purpose of the large negative pulse is to unblock the storage element if it is blocked. It will be appreciated that the storage element will be in the blocked condition whenever the flux completely encircles the large hole, regardless of whether in the clockwise or the counterclockwise direction. In operation of the circuit, however, the polarity of the blocking pulses (store zero pulses) is such that the flux encircling the large hole is always counterclockwise. If the storage element were blocked with the flux lines going in a clockwise direction prior to the first operation of the element, the negative pulse applied to the winding 16 would have no effect, as it would induce flux in a direction in which the flux is already saturated. However, after an initial operation of the storage element, the flux will always go in a counterclockwise direction when the storage element is blocked and the flux induced by the large negative pulse will unblock the storage element. The flux lines will be as shown in FIGURE 1*b*. If the storage element is already unblocked, the large negative pulse will leave the storage element unblocked.

Thus, after the application of the large negative pulse, the storage element will be unblocked with the flux passing around the small hole 13 in a clockwise direction. To store a ONE, a positive pulse is then applied to the winding 16; to store a ZERO, positive pulses are simultaneously applied to the windings 16 and 15. These pulses are preferably the same size as the negative pulse initially applied to the winding 16. Therefore, if a positive pulse is applied to winding 16 alone, the storage element will remain unblocked, but the direction of the flux around the small hole will reverse to be in a counterclockwise direction. Thus, after the positive pulse is applied to the winding 16 alone, the element stores a ONE. If, on the other hand, after the negative pulse is applied to the winding 16, positive pulses are simultaneously applied to windings 16 and 15, the storage element will become blocked with the flux passing around the large hole in a counterclockwise direction. Thus, the simultaneous application of pulses to the windings 16 and 15 will cause the storage element to store a ZERO.

To read the stored digit out of the storage element, a small negative pulse is applied to the winding 16 followed by a positive pulse. The size of the negative pulse is chosen to be insufficient to reverse the flux passing around the large hole when the storage element is blocked, but sufficient to reverse the flux passing around only the small hole when the storage element is unblocked. The size of the positive pulse following the negative pulse is not critical as long as it is sufficiently large to reverse the flux passing around the small hole when the storage element is unblocked. If the storage element is unblocked when the small negative pulse is applied to the winding 16, it will cause the flux around the small hole 13 to reverse in direction. The positive pulse following the negative pulse will switch the flux back to its counterclockwise direction around the small hole 13 leaving the storage element unblocked. This switching back and forth of the flux around the small hole 13 will induce an output signal in an output winding inductively-coupled to the storage element through the small hole 13. Preferably, the winding 15 is used as the output winding, but a separate output winding can be used instead. If, when the small negative pulse is applied to winding 16 the storage element stores a ZERO, the negative pulse will have no appreciable effect on the flux in the storage element. The following positive pulse will not have any effect either, since it will tend to drive the element in a direction in which it is saturated. Thus, no signal will be induced in the output winding. Thus, when the storage element is read out, the presence of an output signal on the output winding indicates that the element stores a ONE, and the absence of a signal on the output winding indicates that the element stores a ZERO.

The storage element shown in FIGURE 2 comprises a body of magnetic material 21 having two large holes 22 and 23 and one small hole 24 defined therein. The small hole 24 is located between the large holes 22 and 23. A winding 25 passes through the hole 23 and through the hole 24, and a winding 26 passes through the hole 24 and through the hole 22. As before, the physical configuration of the storage element is important in that the longest magnetic path around the smaller hole should be of the same order of magnitude or less than the circumference of the larger holes. To achieve optimum noise characteristics, the minimum cross-sectional area of the magnetic path around each of the three holes should be the same. Deviation from this will again result in a decreased signal-to-noise ratio.

The operation of the storage element of FIGURE 2 is much like that of FIGURE 1. The relatively short magnetic path is around the small hole 24 and the relatively large magnetic path passes between the holes 22 and 23 and branches out into two parts, one part passing around the hole 22 and the other part passing around the hole 23. The storage element is unblocked when the material on opposite sides of the small hole 24 is magnetically saturated in opposite directions. FIGURE 2*a* illustrates the pattern of the flux lines under one condition when the storage element of FIGURE 2 is unblocked, with the dashed lines representing flux lines. It is to be observed that no flux encircles the large holes. Instead, the flux lines associated with the large holes close in a C-shaped pattern at the outside edge of the large holes much in the same manner as the large hole flux pattern of FIGURE 1*b*. The storage element of FIGURE 2 is also unblocked when the material in the long magnetic paths around the holes 22 and 23 are both magnetically saturated in one direction or the other. The pattern of the flux lines, when the element of FIGURE 2 is blocked, is shown in FIGURE 2*b* with the dashed lines representing the flux lines. The flux lines pass between the holes 22 and 23 on both sides of the hole 24 in the same direction. Thus, the flux will be counterclockwise around one of the holes 22 and 23 and clockwise around the other.

The winding 25 performs the same function as the winding 16 of the storage element of FIGURE 1, and the winding 26 performs the same function as the winding 15 of the storage element of FIGURE 1. Before either binary digit is stored, a large negative pulse is applied to the winding 25. This pulse will have sufficient magnitude to change flux passing around the large holes 22 and 23. If a ONE is stored, the application of a large negative pulse will cause the element to be unblocked with flux passing around the small hole 24, as is shown in FIGURE 2a. If a ZERO is stored, the flux lines existing in the element after the large negative pulse is applied wil be as shown in FIGURE 2*b* with the flux lines passing in the same direction around each large hole.

To store a ONE, a positive pulse is then applied to the winding 25, and to store a ZERO, positive pulses are simultaneously applied to the windings 25 and 26. These pulses may be the same size as the negative pulse initially applied. If a positive pulse is applied to the winding 25 alone, the storage element will remain unblocked, but the flux around the hole 24 will be reversed to be in a counterclockwise direction. In this condition, the storage element stores a ONE. If positive pulses are simultaneously applied to windings 25 and 26, the element will become blocked with the flux passing around the hole 22 in a counterclockwise direction and around the hole 23 in a clockwise direction. In this condition, the storage element stores a ZERO.

To read the stored digit out of the element of FIGURE 2, a small negative pulse is applied to the winding 25 followed by a positive pulse. The size of the small negative pulse must be such that it is insufficient to reverse flux around one of the large holes, yet sufficient to reverse flux around the small hole. The size of the positive pulse is not critical, but it must be large enough to reverse flux around the small hole. If the storage element stores a ONE, the small negative pulse and the following positive pulse applied to the winding 25 will switch the flux back and forth around the small hole 24; if the storage element stores a ZERO, the small negative pulse and the following positive pulse will have no appreciable effect on the flux in the element. The read out operation will cause a signal to be induced in an output winding passing through the small hole 24 if the storage element stores a ONE, and will cause no signal to be induced in the output winding if the element stores a ZERO. Preferably, the output winding will be the winding 26, but a separate winding can be employed for this purpose.

It should be noted here that the storage element of FIGURE 2 is almost identical to the storage element of FIGURE 1, as far as their magnetic circuits are concerned. This can be shown by comparing the fluxes induced in the two elements by their corresponding windings. The reluctance of a magnetic circuit is a direct function of the length of the magnetic circuit and an inverse function of the cross-sectional area of the flux path (storage elements). Thus, it can be seen that when either storage element is in a "blocked" condition, the flux is in the same direction on both sides of the small hole, the minimum path lengths for all of the flux is equal to at least the circumference of one large hole and the minimum cross-sectional area through which all of the flux passes is 2A (times the core thickness). When either core element is in an "unblocked" condition, the flux on opposite sides of the small holes is in opposite directions, the minimum path length is the circumference of the small hole, and the minimum cross-sectional area of the flux path is A (times the core thickness).

The magnetic identity of the two storage elements of FIGURES 1 and 2 may be further demonstrated if each of the storage elements is pictured as comprising one short magnetic path and two long magnetic paths, each of which have a portion in common with the short magnetic path. Thus, the storage element of FIGURE 1 has a short magnetic path around the small hole, one long magnetic path of a width A around the large hole and having a portion in common with the short magnetic path being the portion between the large and small holes, and a second long magnetic path of a width A adjacent to and around the first long path and having a portion in common with the short magnetic path, being the portion to the left (in the drawings) of the small hole. The corresponding three magnetic paths of the storage element of FIGURE 2 are believed evident from FIGURES 2*a* and 2*b*.

In the read out operation of the storage elements of both FIGURES 1 and 2, it will be noted that the state of the element is the same after read out as it was before read out. Thus, the stored digit is not erased by the read out operation.

In the description of the operation of the storage elements of both FIGURES 1 and 2, the choice of which winding is used for what purpose is arbitrarily selected and the functions of these windings can be reversed.

The memory system shown in FIGURE 3 comprises a multiplicity of magnetic storage elements 31, which are of the type illustrated in FIGURE 1. The storage elements are arranged in tiers which are stacked vertically to form columns of storage elements, each column containing one element from each tier. A plurality of tier coils 32 is provided, each inductively-coupled to a different tier of storage elements 31. The tier coils 32 link the storage elements by passing through the large and small holes of each of the elements of a tier. The tier coils 32 perform the function of the winding 15 in FIGURE 1. A plurality of column coils 33 is provided, each inductively-coupled to a different column of elements 31. Each column coil is linked to the elements by passing through only the small hole of each element in a column. Column coils 33 perform the function of the winding 16 in FIGURE 1.

To facilitate the description of the operation, arrows are shown on the coils 32 and 33. A pulse applied to a coil in the direction of the arrow is defined as a positive pulse, and a pulse in the opposite direction is defined as a negative pulse. In the operation of the system, a binary word consisting of a plurality of digits may be stored in or read out of a selected column of memory elements.

To store a binary word, column selector 34 selects a column coil 33 and applies a large negative pulse to the selected coil 33. This large negative pulse unblocks all the memory elements in the selected column linked by the selected column coil 33. Following the negative pulse, the column selector 34 applies a positive pulse to the selected coil 33. Simultaneously with this application of a positive pulse to the selected column coil, binary input-output unit 35 applies positive pulses to those tier coils 32 which link memory elements in the selected column in which the ZERO's are to be stored. As a result, each memory element in the selected column which receives simultaneous positive pulses from both the column and tier coils linking it will become blocked and will store a ZERO. The remaining elements in the selected column receiving a positive pulse only on the column coil linking them will remain unblocked and will stores ONE's.

To read a digital word out of a selected column of memory elements, the column selector 34 applies the small negative read out pulse to the selected column coil followed by a positive pulse. This action will cause the flux around the small hole of each of those storage elements in the selected column which store ONE's to switch back and forth, thereby inducing a signal in the tier coils 32 linking those memory elements. The flux in the memory elements of the selected column which store ZERO's will not be appreciably effected and, therefore, no signal will be induced in the tier coils 32 linking these memory elements. Thus, the output signals induced in the tier coils 32 indicate the stored binary word in the selected column. These binary signals are applied to the binary input-output unit 35.

The sizes of the pulses applied to the coils 32 and 33 during the storage and read out operations correspond with the sizes of the pulses applied to windings 15 and 16 of the storage element shown in FIGURE 1. Thus, the large negative pulse applied to the selected column coil 33 must be of sufficient size to reverse the flux passing around the large hole of a memory element 31. The positive pulses applied to the windings 33 and 32 during the storage operation are of the same size as the negative pulse. The small negative read out pulse applied to the selected column coil 33 must be of such size as to be insufficient to reverse flux passing around the large hole of the storage elements 31, but sufficient to reverse flux passing around the small hole.

The column selector 34 may be a switching core matrix of the type disclosed in Patent No. 3,072,892, issued January 8, 1963, to Wallace A. Kluck entitled Magnetic Core Matrix. To obtain the large pulse from the switching core matrix, the selected core of the matrix is switched rapidly from one state to the other; and to obtain the small pulse, the selected core is switched more slowly from one state to the other. The binary input-output unit is synchronized with the drive of the switching core matrix comprising the column selecter 34 so that during a storage operation it will apply pulses simultaneously with the application of the positive pulses to the selected column coil 33 by the column selector 34.

The memory system has been described as being arranged in tiers and columns. Of course, it does not have to have this physical arrangement as long as the circuit is the same. Accordingly, the term "electrically arranged" used in the claims refers only to the electrical circuit and does not define the physical position of the memory elements.

The above description is of a preferred embodiment of the invention, and many modifications may be made thereto without departing from the spirit and scope of the invention which is limited only as defined in the appended claims.

What is claimed is:

1. The method of storing and nondestructively reading out binary data in a magnetic storage element having a rectangular hysteresis characteristics and defining a short magnetic path and two long magnetic paths each of which has a portion in common with said short magnetic path, comprising the steps of:

(a) preparing said element for storage by applying an elecrtomagnetic field to said element to establish flux saturated in said short magnetic path so that the direction of flux in said common portions is opposite, and thereafter (b) storing one of two binary digits by applying an electromagnetic field to said element to reverse the flux flow in said short magnetic path, and (c) storing the other of said binary digits by applying an electromagnetic field to said element to establish flux saturated in said long magnetic paths so that the flux direction in said common portions is the same, and (d) nondestructively reading the stored binary digit out of said element by applying a first polarity electromagnetic field to said element of an intensity sufficient to reverse the flux in said short magnetic path and insufficient to reverse the flux in said long magnetic paths, thereafter (e) applying a second polarity electromagnetic field to said element tending to establish flux saturated in said short magnetic path, and (f) sensing a flux direction change in said short magnetic path.

2. The method set forth in claim 1, wherein said magnetic storage element defines a small hole and a large hole adjacent thereto and including the steps of:

(a) preparing said element for storage by applying an electromagnetic field to said element to establish flux saturated in said short magnetic path surrounding said small hole, and thereafter, (b) storing one of two binary digits by applying an electromagnetic field to reverse the flux flow surrounding said small hole, and (c) storing the other of said two binary digits by applying an electromagnetic field to said element to establish flux saturated in said long magnetic paths surrounding said large hole and including said small hole with flux passing on both sides of said small hole in the same direction.

3. The method set forth in claim 1, wherein said magnetic storage element defines a small hole between two large holes and including the steps of:

(a) preparing said element for storage by applying an electromagnetic field to said element to establish flux saturated in said short magnetic path surrounding said small hole, and thereafter (b) storing one of two binary digits by applying an electromagnetic field to said element to reverse the flux flow surrounding said small hole, and (c) storing the other of said two binary digits by applying an electromagnetic field to said element to establish flux saturated in said long magnetic paths each surrounding a respective large hole.

4. The method of storing and nondestructively reading out binary data in a magnetic storage element having a rectangular hysteresis characteristic and defining a short magnetic path and two long magnetic paths each having a portion in common with said short magnetic path and first and second coils respectively coupled to said common portions, comprising the steps of:

(a) storing one of two binary digits by applying a signal to said first coil to establish flux saturated in said short magnetic path so that the flux direction in said common portions is opposite, and (b) storing the other of said two binary digits by simultaneously applying an electrical signal to said first and second coils to establish flux saturated in said long magnetic paths so that the flux direction in said common portions is the same, and (c) nondestructively reading the stored binary digits out of said element by applying a signal of a first polarity to one of said coils of an intensity sufficient to reverse the direction of flux in said short magnetic path and insufficient to reverse the direction of flux in said long magnetic paths, thereafter (d) applying an electrical signal of a second polarity to said one coil tending to establish flux in said short magnetic path, and (e) sensing a flux direction change in said short magnetic path.

5. The method set forth in claim 4, including the steps of:

(a) preparing said element for storage by applying an electrical signal to one of said coils to establish flux saturated in said short magnetic path and wherein (b) storing said one of two binary digits by applying an electrical signal to said first coil reverses the flux in said short magnetic path.

6. The method set forth in claim 4, wherein the step of sensing a flux direction change in said short magnetic path comprises sensing the output signal of the other of said coils.

7. The method set forth in claim 5, wherein the step of sensing a flux direction change in said short magnetic path comprises sensing the output signal of the other of said coils.

8. The method of storing and nondestructively reading out binary data in a memory system having a plurality of magnetic storage elements electrically arranged in tiers and columns with each column comprising one element from each tier, each of said elements having a rectangular hysteresis characteristic and defining a short magnetic path and two long magnetic paths each having a portion in common with said short magnetic path, said system having a tier coil for each tier with each tier coil coupled to one of said common portions defined by each element in its corresponding tier and a column coil for each column with each column coil coupled to the other of said common portions defined by each element in its corresponding column; the steps of storing binary data in said system comprising:

(a) applying a first polarity signal to a selected column coil to establish flux saturated in the short magnetic path of the selected column elements so that the direction of flux in said common portions is opposite, thereafter (b) storing one of two binary digits in said selected column elements by applying a second polarity signal to said selected column coil to reverse the flux flow in the short magnetic path of said selected column elements and (c) storing the other of said binary digits by applying simultaneously a second polarity signal to said selected column coil and a selected tier coil to establish flux saturated in the long magnetic paths of the selected element so that the direction of flux in the common portions is the same; and (d) nondestructively reading the stored binary digit out by sequentially applying a signal of said first and second polarity to said selected column coil of sufficient intensity to change the direction of flux in the short magnetic path and insufficient to change the direction of flux in the long magnetic paths, and (e) sensing a flux direction change in the short magnetic path of said selected elements.

9. The method set forth in claim 8 wherein the step of sensing a flux direction change in the short magnetic path comprises sensing the output signal of a tier coil.

10. The method of storing and nondestructively reading out binary data in a memory system having a plurality of magnetic storage elements electrically arranged in tiers and columns with each column comprising one element from each tier, each of said elements having a rectangular hysteresis characteristic and defining a short magnetic path and two long magnetic paths each having a portion in common with said short magnetic path, said system having a tier coil for each tier with each tier coil coupled to one of said common portions defined by each element in its corresponding tier and a column coil for each column with each column coil coupled to the other of said common portions defined by each element in its corresponding column; the steps of storing binary data in said system comprising:

(a) applying a first polarity signal to a selected one of a column or tier coil to establish flux saturated in the short magnetic path of the selected elements so that the direction of flux in said common portions is opposite, thereafter (b) storing one of two binary digits in said selected elements by applying a second polarity signal to said selected one coil to reverse the flux flow in the short magnetic path of said selected elements and (c) storing the other of said binary digits by applying simultaneously a second polarity signal to said selected one coil and a selected other coil to establish flux saturated in the long magnetic paths of the selected elements so that the direction of flux in the common portions is the same; and (d) nondestructively reading the stored binary digit out by sequentially applying a signal of said first and second polarity to said selected one coil of sufficient intensity to change the direction of flux in the short magnetic path and insufficient to change the direction of flux in the long magnetic paths, and (e) sensing a flux direction change in the short magnetic path of said selected elements.

11. The method set forth in claim 10 wherein the step of sensing a flux direction change in the short magnetic path comprises sensing the output signal of said other coil.

References Cited by the Examiner

UNITED STATES PATENTS

| | | | |
|---|---|---|---|
| 3,046,532 | 7/62 | Broadbent | 340—174 |
| 3,077,582 | 2/63 | Bauer | 340—174 |
| 3,117,308 | 1/64 | Sublette | 340—174 |
| 3,128,388 | 4/64 | Robinson | 307—88 |

IRVING L. SRAGOW, *Primary Examiner.*